United States Patent [19]

Tanaka et al.

[11] Patent Number: 4,482,085

[45] Date of Patent: Nov. 13, 1984

[54] TAPE DRIVING MECHANISM FOR A TAPE RECORDER

[75] Inventors: Shinsaku Tanaka; Tadao Arata, both of Tokyo, Japan

[73] Assignee: Tanashin Denki Co., Ltd., Tokyo, Japan

[21] Appl. No.: 461,603

[22] Filed: Jan. 27, 1983

[30] Foreign Application Priority Data

Jan. 28, 1982 [JP] Japan .............................. 57-10800[U]

[51] Int. Cl.³ .......................................... B65H 17/22
[52] U.S. Cl. .................................. 226/187; 226/190; 242/208
[58] Field of Search ............... 226/181, 183, 186, 187, 226/190, 191, 194, 90; 242/197–204, 206, 208–210

[56] References Cited

U.S. PATENT DOCUMENTS 2,712,448  7/1955  Schroter ............................. 242/204
3,294,333 12/1966  Sanford ............................. 242/206
3,351,255 11/1967  Gorawski et al. ................. 226/181
3,840,164 10/1974  Takenaka et al. ................... 226/90

Primary Examiner—Leonard D. Christian
Attorney, Agent, or Firm—Frishauf, Holtz, Goodman & Woodward

[57] ABSTRACT

A tape driving mechanism has a pin projecting from a base plate of a tape recorder, a capstan shaft rotatably mounted on the base plate and a pinch roller holder rotatably mounted on the pin. The mechanism further comprises a pinch roller rotatably mounted on a first end portion of the pinch roller holder opposite to the pin, a torsion coil spring and an urging member. The torsion coil spring is provided on a portion of the pinch roller holder with both ends of the torsion coil spring in engagement with other portions of the pinch roller holder. The urging member urges an end portion of the torsion coil spring to rotate and urge the pinch roller holder to resiliently press the pinch roller against the capstan shaft.

14 Claims, 9 Drawing Figures

TAPE DRIVING MECHANISM FOR A TAPE RECORDER

BACKGROUND OF THE INVENTION

This invention relates to a tape driving mechanism for a tape recorder, in which a torsion coil spring for urging a pinch roller against a capstan shaft is provided on a portion of a pinch roller holder.

In the usual tape recorder, a magnetic tape is pinched between a capstan shaft and a pinch roller and is driven as the capstan shaft rotates, while a magnetic head is held in contact with the tape during recording or reproduction.

The pinch roller must be urged against the capstan shaft to feed the magnetic tape. Usually, a torsion coil spring is used to urge the pinch roller against the capstan shaft.

Usually, the torsion coil spring is mounted as shown in FIG. 1. A pin 102 is provided on a base plate 101 of the recorder and projects upright. A pinch roller holder 103 is rotatably mounted on one end on the pin 102. A pinch roller 104 is rotatably supported by the pinch roller holder 103 at an end portion thereof opposite the pin 102. A torsion coil spring 105 is mounted on the pin 102, with its ends engaged with portions of the pinch roller holder 103. When one end portion of the torsion coil spring 105 is urged in the direction of the arrow in FIG. 2, the pinch roller holder 103 is rotated. When the end portion of the spring 105 is a little further urged after the pinch roller 104 has been brought into contact with the capstan shaft 106, it is slightly deformed as shown in FIG. 3. In this state, a restoring force corresponding to the contact force between the capstan shaft 106 and pinch roller 104 is stored in the spring 105.

In the above construction, the torsion coil spring 105 is mounted on the pin 102 and held in forced contact therewith at point P as shown in FIG. 4. Therefore, a contact resistance is produced between the spring 105 and pin 102 when the pinch roller holder 103 is rotated. This reduces the contact force between the capstan shaft 106 and pinch roller 104. In addition, the pin 102 and spring 105 are liable to be damaged due to local friction between the pin 102 and spring 105. Further, the spring 105 must be mounted on the pin 102 at the same time the pinch roller holder 103 is mounted on the pin 102. Considerable skill is therefore required for mounting these components.

In order to solve the above problems, a tape driving mechanism shown in FIG. 5 has been proposed. In this mechanism a pinch roller holder 103 has a sleeve 107 coaxial with the axis of its rotation. This sleeve 107 is fitted on a pin 102. A torsion coil spring 105 is mounted on the outer periphery of the sleeve 107 so that it is not in direct contact with the pin 102.

With this construction, since the spring 105 and pin 102 do not contact, the pinch roller 104 can be strongly urged against the capstan shaft 106. For the same reason, the pin 102 and spring 105 are not damaged. Further, the pinch roller holder 103 and spring 105 may be easily mounted by first putting the sleeve 107 on the pinch roller holder 103, then fitting the spring 105 on the sleeve 107 and finally fitting this assembly on the pin 102.

The construction of FIG. 5, however, uses the sleeve 107 as an additional part, so that it is more expensive than the construction of FIGS. 1 to 4.

SUMMARY OF THE INVENTION

An object of the invention is to provide a tape driving mechanism for a tape recorder, which makes it easy to fit a torsion coil spring for obtaining a necessary contact pressure between the capstan shaft and pinch roller in the pinch roller holder without increasing the number of parts and which can eliminate damage to the torsion coil spring and pin.

A tape driving mechanism according to the invention has a torsion coil spring which is mounted on a portion of a pinch roller holder. The pinch roller holder is rockably mounted on a pin projecting upright from a base plate of a tape recorder and holds a pinch roller on its end portion opposite the pin, with its other portions holding the opposite ends of the torsion coil spring. One end portion of the spring is urged by an urging member to urge the pinch roller against the capstan shaft.

Since the torsion coil spring is mounted on a portion of the pinch roller holder away from the pin, no contact resistance is produced between the torsion coil spring and the pin. Thus, the pinch roller can be strongly urged against the capstan shaft, and damage to the pin or spring can be avoided. Further, the torsion coil spring can be supported by the pinch roller holder in advance very easily to facilitate the assembling of the tape driving mechanism. Further, since there is no need to provide any additional component part, the mechanism is simple and may be manufactured at low cost.

DETAILED DESCRIPTION OF THE PREFERRED EMBODIMENT

Figure 6:
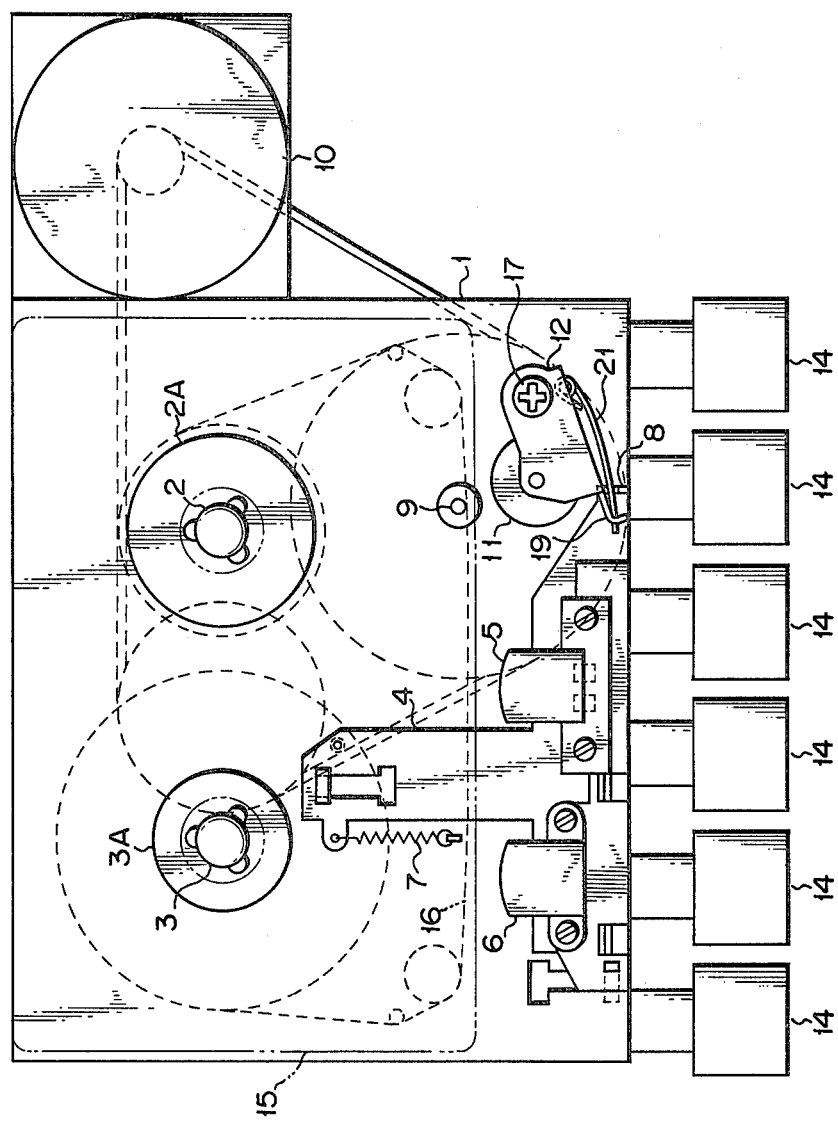
FIG. 6 is plan view of the mechanical section of a cassette tape recorder with a tape driving mechanism according to the present invention.

FIG. 6 shows the mechanical part of a cassette tape recorder with a tape driving mechanism of the invention. Numeral 1 designates a base plate of the recorder. A pair of reel shafts 2 and 3 penetrate and upwardly project from the base plate 1. A head holder 4 can slide over the base plate 1 toward and away from the reel shafts 2 and 3. The head holder 4 holds a magnetic head 5 for recording and reproduction and a magnetic head 6 for erasing. More precisely these magnetic heads are mounted on the top of the holder 4. The holder 4 is spring biased by a tension coil spring 7 in such a direction as to separate the magnetic heads 5 and 6 from the reel shafts 2 and 3. The head holder 4 has an urging member provided at its right end. The urging member is a bifurcated portion 8 extending at right angles to the main portion of the head holder 4.

A capstan shaft 9 and a motor 10 are mounted on the base plate 1 of the recorder. The capstan shaft 9 upwardly projects from the base plate 1. The motor 10 can drive the capstan shaft 9 and the reel shaft 2 or 3 at the same time.

Figure 7:
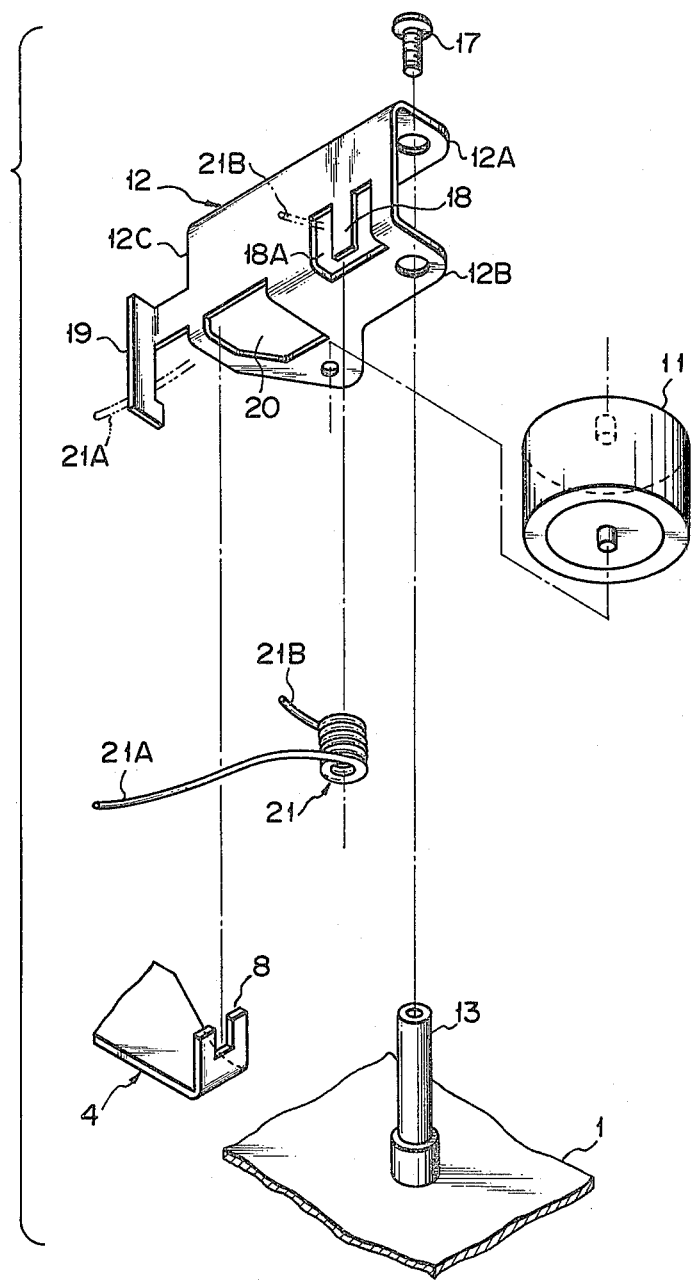
FIG. 7 is an exploded perspective view of the tape driving mechanism of the invention.

A pinch roller holder 12 supporting a pinch roller 11 is rotatably mounted by a pin 13 on top of the base plate 1 of the recorder (see FIG. 7). A plurality of push buttons 14 are mounted along one edge of the base plate 1. They are pushed to start various operations of the tape recorder.

When both tape reels of a tape cassette 15 are put into engagement with the reel shafts 2 and 3, a magnetic tape 16 is inserted in a gap between the capstan shaft 9 and pinch roller 11 and positioned ahead of the magnetic heads 5 and 6.

Figure 8:
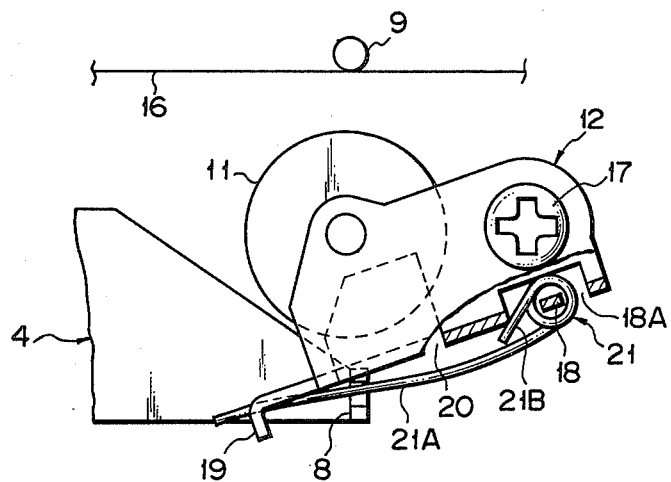
FIG. 8 and FIG. 9 are plan views, partly broken away, of the tape driving mechanism of the present invention in different states.

As shown in FIG. 7, the pinch roller holder 12 is channel-shaped. It is rockably mounted at one end on the pin 13. A retainer screw 17 is screwed into the pin 13 from the top thereof to prevent the pinch roller holder 12 from being detached from the pin 13. The pinch roller 11 is rotatably mounted between opposed upper and lower portions 12A and 12B of the pinch roller holder 12. The central portion 12C of the pinch roller holder 12 has a channel-shaped notch 18A positioned near its axis of rotation. A central portion in the channel-shaped notch 18A serves as a spring support piece 18. The pinch roller holder 4 also has a spring retainer piece 19 in its central portion 12C. The pinch roller holder 12 has an opening 20 extending in its lower and central portions 12B and 12C. A torsion coil spring 21 is mounted on the spring support piece 18 in a state in which a restoring force in the winding direction is slightly stored. It is upwardly fitted on the spring support piece 18. One end portion 21A of the spring 21 extends to the end of the pinch roller holder 12 remote from the axis of rotation thereof and is engaged in the spring retainer piece 19 as shown by two-dot chain lines in FIG. 7. The other end 21B of the spring 21 is engaged with the edge of the channel-shaped notch 18A as shown by two-dot chain lines. The end portion 21A of the spring 21 extending near the opening 20 is received in the bifurcate portion 8 of the head holder 4. As shown in FIG. 8, the portion 8 partly extends in the opening 20. The capstan shaft 9, pinch roller 11, pinch roller holder 12 supporting the pinch roller 11, pin 13 supporting the pinch roller holder 12, torsion coil spring 21 and portion 8 used to urge the spring 21, form a tape driving mechanism.

The operation of the tape recorder will now be described.

Figure 9:
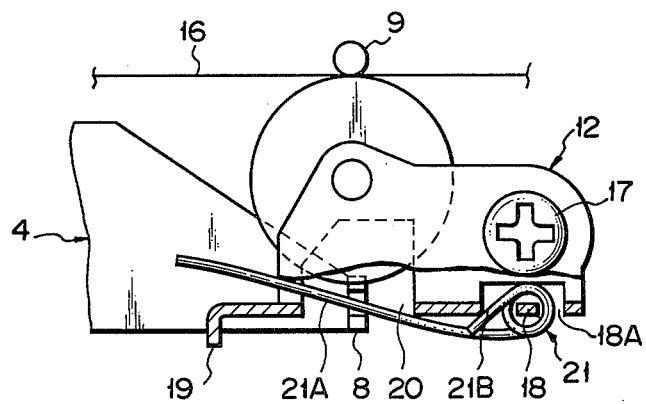

When the push button 14 for recording and reproduction is depressed as shown in FIG. 6, the motor 10 is rotated to drive the capstan shaft 9. At the same time, the head holder 4 is forwardly displaced against the force of the spring 7, bringing the magnetic heads 5 and 6 into contact with the magnetic tape in the tape cassette 15. As the head holder 4 is forwardly displaced, the pinch roller holder 12 is rotated about the pin 13 because the bifurcated portion 8 and pin 13 are in mutual engagement. Thus, the pinch roller 11 is urged against the capstan shaft 9 to clamp the magnetic tape 16. Since the torsion coil spring 21 is not in contact with the pin 13, no resistance tending to prevent the rotation of the pinch roller holder 12 is produced at this time. The pinch roller holder 12 can thus be rotated lightly and smoothly. After the pinch roller 11 has been urged against the capstan shaft 9, the head holder 12 is further forwardly moved slightly. With this movement, further restoring energy in the winding direction is stored in the torsion coil spring 21 as shown in FIG. 9 to increase the force urging the pinch roller 11 against the capstan shaft 9. As the head holder 4 moves forward a torque transmitting mechanism (not shown) mounted on the underside of the base plate 1 transmits the torque of the motor 10 to the take-up reel 2. The magnetic tape 16 is thus driven at a constant speed regulated by the capstan shaft 9 and taken up on the take-up reel in the tape cassette 15. In this way, a predetermined recording or reproducing operation is carried out.

When a push button 14 for stopping operation is depressed during recording or reproducing, the push button for the recording or reproduction is automatically released and restored to the initial stage. As a result, the head holder 4 is moved by the spring 7, thus separating the magnetic heads 5 and 6 from the magnetic tape 16. As the head holder 4 returns to the initial position, the pinch roller holder 12 is also rotated in the restoring direction to separate the pinch roller 11 from the capstan shaft 9 because the portion 8 and torsion coil spring 21 are still in mutual engagement. At this time, too, no resistance tending to prevent the rotation of the pinch roller holder 12 is produced. The pinch roller holder 12 can thus be restored lightly and smoothly. Further, once the head holder 4 reaches its initial position, the torque can no longer be transmitted from the motor 10 to the reel shaft 2 and power can no longer be supplied to the motor 10. Thus, the reel shaft 2 and capstan shaft 9 are stopped.

As has been shown, with the tape driving mechanism of this embodiment, in which the torsion coil spring 21 is mounted on the spring support piece 18 provided on the pinch roller holder 12, no contact resistance is produced between the torsion coil spring 21 and pin 13 when the pinch roller holder 21 is rotated. Thus, the pinch roller 11 can be strongly urged against the capstan shaft 9. Also, since the pin 13 and torsion coil spring 21 are not in contact with each other, they never damages each other.

Further, the torsion coil spring 21 can be mounted on a portion (i.e., the spring support piece 18) of the pinch roller holder 12 before fitting the pinch roller holder 12 on the base plate 1. This mounting can be done very easily to facilitate the assembling of the tape recorder.

Figure 1:
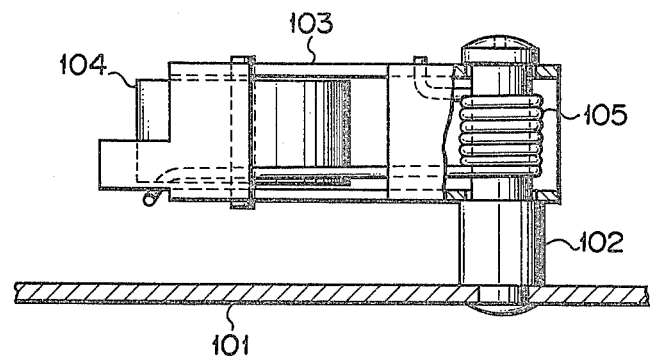
FIG. 1 is a side view of a known tape driving mechanism.
Figure 2:
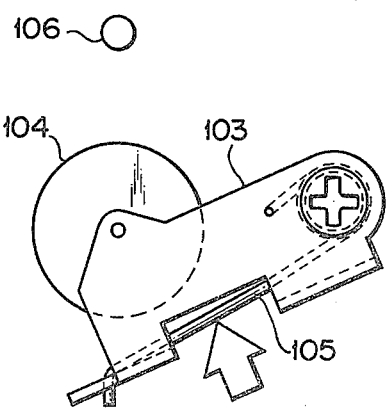
FIG. 2 and FIG. 3 are plan views of the tape driving mechanism shown in FIG. 1.
Figure 3:
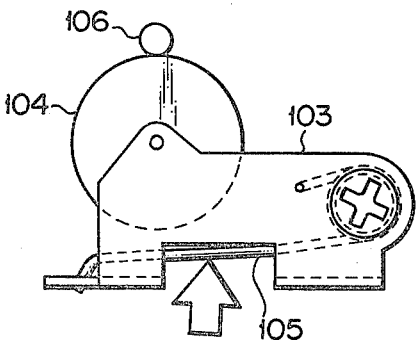
Figure 4:
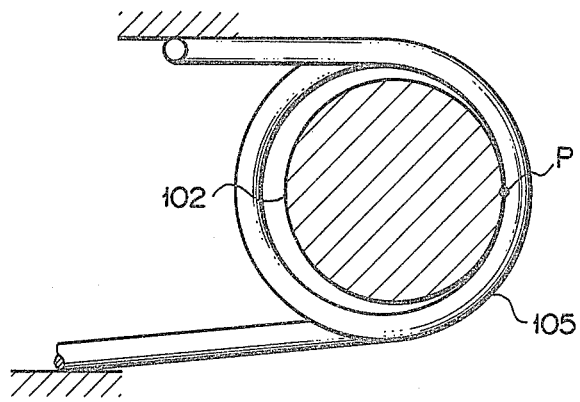
FIG. 4 is an enlarged plan view of the mechanism of FIGS. 1-3, showing the positional relation between a torsion coil spring and a pin.
Figure 5:
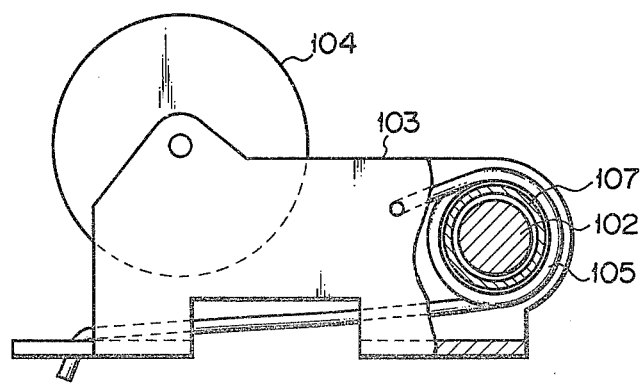
FIG. 5 is a plan view, partly broken away, of another known tape driving mechanism.

Further, no additional component part as in the case of FIG. 5 is necessary, so that the construction can be simple.

The present invention is not limited to the embodiment described above. In the above embodiment the end 21A of the torsion coil spring 21 is urged by a portion (i.e., bifurcated portion 8) of the head holder 4. It should be clear that the end 21A may be urged by an operating member, on which the pertinent push button 14 is mounted, or by any other member. Further, the invention may be applied to various tape recorders other than a cassette tape recorder, for example, open reel tape recorders.

What we claim is:
1. A tape driving mechanism for a tape recorder comprising:
   a pin projecting upright from a base plate of the tape recorder;
   a capstan shaft rotatably mounted on said base plate;
   a pinch roller holder having two end portions, one end portion thereof being rotatably supported on said pin, said pin defining a rotation axis of said pinch roller holder;

a pinch roller rotatably mounted on the other end portion of said pinch roller holder opposite said pin and spaced from said one end of said pinch roller holder;

a torsion coil spring having an intermediate coil portion held by said pinch roller holder and two end portions; and an urging member for urging an end portion of said torsion coil spring to rotate and urge said pinch roller holder to rotate about said rotation axis to thereby urge said pinch roller against said capstan shaft;

said pinch roller holder having a spring support portion spaced from said rotation axis on which said coil portion of said torsion coil spring is supported at a position away from said rotation axis of said pinch roller holder; and a pair of spring holding portions arranged away from said rotation axis for holding both end portions of said torsion coil spring against an urging force produced by said coil portion of said torsion coil spring.

2. The tape driving mechanism of claim 1, wherein said two end portions of said torsion coil spring are substantially straight.

3. The tape driving mechanism of claim 2, wherein said coil portion of said torsion coil spring is detachably supported on said spring support portion of said pinch roller holder.

4. The tape driving mechanism of claim 1, wherein said coil portion of said torsion coil spring is detachably supported on said spring support portion of said pinch roller holder.

5. The tape driving mechanism of claim 1, wherein said end portion are held by said spring holding portions of said pinch roller holder such that said coil portion is wound in a spring winding direction, thereby producing an unwinding urging force in said torsion coil spring which is restrained by said spring holding portions of said pinch roller holder.

6. The tape driving mechanism of claim 1, wherein said spring support portion of said pinch roller holder comprises a support piece integral with said pinch roller holder and extending from said pinch roller holder to form a shaft-like member on which said coil portion of said torsion coil spring is mounted.

7. The tape driving mechanism of claim 6, wherein said end portions of said torsion coil spring are substantially straight, and bear against said spring holding portions of said pinch roller holder.

8. The tape driving mechanism of claim 7, wherein said coil portion of said torsion coil spring is wound in a spring winding direction and has an urging force tending to unwind said coil spring portion, said urging member urging said end portion of said torsion coil spring to further wind said coil spring portion to produce said rotation of said pinch roller holder about said rotation axis.

9. The tape driving mechanism of claim 8, wherein said spring support portion is spaced from said pin in a given direction, and wherein said urging member is arranged to engage said end portion of said coil spring at a position spaced from said spring support portion in a direction toward said pinch roller.

10. The tape driving mechanism of claim 9, wherein said urging member comprises a bifurcated portion engaging an end portion of said torsion coil spring.

11. The tape driving mechanism of claim 1, wherein said urging member comprises a bifurcated portion engaging an end portion of said torsion coil spring.

12. The tape driving mechanism of claim 1, wherein said pinch roller holder comprises a channel-shaped member having upper and lower surface portions and a rear surface portion interconnecting said upper and lower surface portions to form a generally U-shaped cross-section; said upper and lower surface portions of said channel member having openings through which said pin is received to rotatably mount said pinch roller holder; said upper and lower surface portions having means for rotatably mounting said pinch roller to said channel-shaped member; and said spring support portion comprising a projection integrally formed with said rear portion of said channel-shaped member.

13. The tape driving mechanism of claim 12, wherein said projection and said pin are closely adjacent each other, and are both spaced a greater distance from said pinch roller than from each other.

14. The tape driving mechanism of claim 12, wherein said urging member comprises a bifurcated member for engaging said end portion of said torsion coil spring.

* * * * *